United States Patent [19]
Gross

[11] Patent Number: 5,914,661
[45] Date of Patent: Jun. 22, 1999

[54] HELMET MOUNTED, LASER DETECTION SYSTEM

[75] Inventor: Michael D. Gross, Woodland Hills, Calif.

[73] Assignee: Raytheon Company, Los Angeles, Calif.

[21] Appl. No.: 08/589,723

[22] Filed: Jan. 22, 1996

[51] Int. Cl.⁶ .................................................. G08B 17/12
[52] U.S. Cl. .......................... 340/600; 340/555; 340/556; 340/557; 250/206.2; 250/216; 250/214 A; 250/336.1; 250/225; 250/227; 356/141.2; 356/141.5; 434/22
[58] Field of Search ..................................... 340/557, 600, 340/556, 555; 250/206.2, 216, 214 A, 336.1, 225, 227; 356/141.5, 141.2; 434/22

[56] References Cited

U.S. PATENT DOCUMENTS

| | | | |
|---|---|---|---|
| 3,950,862 | 4/1976 | Schiel et al. | 434/22 |
| 4,063,368 | 12/1977 | McFarland et al. | 434/22 |
| 4,682,024 | 7/1987 | Halldorsson et al. | 250/225 |
| 4,719,343 | 1/1988 | Tressler, III | 250/203 R |
| 4,721,852 | 1/1988 | Muller | 250/227 |
| 4,769,531 | 9/1988 | Malek | 250/203 R |
| 4,944,588 | 7/1990 | Kohler | 356/152 |
| 4,962,311 | 10/1990 | Poisel et al. | 250/216 |
| 5,200,827 | 4/1993 | Hanson et al. | 358/211 |
| 5,243,179 | 9/1993 | Bjorkman | 250/206.2 |
| 5,280,167 | 1/1994 | Dubois | 250/214 VT |
| 5,317,582 | 5/1994 | Siebert | 372/38 |
| 5,428,215 | 6/1995 | Dubois et al. | 250/206.2 |
| 5,440,116 | 8/1995 | Bolander et al. | 250/216 |
| 5,525,980 | 6/1996 | Holt | 342/20 |

FOREIGN PATENT DOCUMENTS

| | | |
|---|---|---|
| 0 395 613 | 10/1990 | European Pat. Off. . |
| 2 506 445 | 11/1982 | France . |
| 2 660 752 | 10/1991 | France . |
| 40 03 960 | 8/1990 | Germany . |
| 2 249 449 | 5/1992 | United Kingdom . |

*Primary Examiner*—Jeffery Hofsass
*Assistant Examiner*—Benjamin C. Lee
*Attorney, Agent, or Firm*—Leonard A. Alkov; Glenn H. Lenzen, Jr.; William C. Schubert

[57] ABSTRACT

A portable, low cost, laser detection system which generates an alarm signal that can be used to produce visual and/or audible warnings indicating the range, location and type laser energy detected. Such laser detection system utilizes a cooperating quadraplex sensor assembly, to provide a complete 360 degree laser detection coverage, mounted on a helmet assembly which includes a helmet shell, a cushioned impact liner coextensive with the interior surface of the helmet shell and a suspended crown support liner the combination of which provides enhanced protection of the user and stabilization of the laser detection system.

18 Claims, 4 Drawing Sheets

HELMET MOUNTED, LASER DETECTION SYSTEM

BACKGROUND OF THE INVENTION

This invention relates generally to a helmet mounted, laser detection system. More particularly, this invention relates to a laser detection system which provides a 360 degree field of view detection coverage to identify the region of origination of the laser, identification of potential direct or indirect laser energy and automatically alert the wearer to the detected laser and the direction of laser illumination.

Modern technology, especially computers and electronics, have advanced rapidly in the recent past. Accordingly, it would be advantageous to apply these technological advances to the art of war, specifically to weapons and other equipment designed to make the modern soldier a more efficient fighting machine.

One approach to applying the technological advances to modernize the soldier is to view the individual soldier an a platform for the system. The system will give the individual soldier the ability for real-time situation awareness and advanced communication capability keeping the soldier immediately responsive and flexible enough to operate in an uncertain and frequently chaotic environment.

An object of the LW system is to design and develop a system that integrates a Computer/Radio Subsystem (CRS), Weapons Subsystem (WS), Integrated Helmet Assembly Subsystem (IHAS), Protective Clothing and Individual Equipment Subsystem (PCIES), and Software Subsystem that includes the soldier as the platform and facilitates the simple interoperation of all subsystems to increase combat effectiveness, awareness and survivability.

Digital processing of sensor and database information by weapon system is especially important in the battlefield. For the company, platoon, squad or individual to be coordinated and to capitalize on this information, the soldier as a weapon system must be provided with the capabilities that can selectively receive, transmit and process this information. One example of this interface is a hands-off laser detection system for advanced visual and/or audible identification of a laser threat.

Most methods for dealing with a laser threat involves some active countermeasures, evasive maneuvers, or direct engagement. Generally, these methods will be used by combat units in various combinations. However, all of these alternatives presume that, in most situations, the hostile laser has been detected, identified, and exactly localized within the extremely short span of time available. Crews in fighting vehicles, infantry soldiers, and others must be instantaneously warned of specific laser threats to maintain/enhance their survivability. Thus, it has become necessary to develop a compact, rugged, lightweight and automatic laser warning system capable of detecting and determining the direction, type and location of incident laser radiation with a comparatively high degree of accuracy in a timely manner.

The military presently uses a laser detection systems for battlefield simulation games. One such system is referred to as the Modular Integrated Laser Engagement System (MILES) developed by the Naval Training Equipment Center working in conjunction with military contractors. The Miles system equips soldiers with pulsed semiconductor lasers and sensors. The lasers may be attached to a variety of weapons that each fire a characteristic sequence of pulses. When the war games start, the soldiers fire laser pulses at each other, and the sensors keep score. However, such systems are frequently awkward to wear, do not provide the soldier with advance warning of the laser threat and are not battlefield effective. Therefore, means for providing the soldier with advance information of a laser threat in a lighter weight packaging is needed.

The present invention is designed to provide a laser detection system, which can be integrated within a LW system, and to identify hostile lasers by their wavelength, pulse repetition frequency, and incoming power. The laser detection system exploits many of the components available in a LW system including helmet shell, mission-adaptable display/sensor modules for day-night sighting, data acquisition, and communications headgear.

SUMMARY OF THE INVENTION

The present invention provides an innovative and improved laser detection system for use with a helmet. The laser detection system incorporates a plurality of sensors adapted to detect laser energy and generate an output signal responsive to the detection of the laser energy.

It is therefore an object of the present invention to provide a laser detection system which is attached to a helmet to ensure the soldier receives timely alert of a laser threat. For display image sources, the system uses a visual and optional auditory alert providing the soldier an identification of the type of laser and the direction of the threat in time to act before the enemy does.

It is a particular object of the invention to provide a laser detection system capable of instantaneous all-around laser detection. It is another object of the present invention to provide a laser detection system capable of identifying potential direct or indirect laser energy with the use of multiple sensors integrated with the soldier's helmet. The laser detection system covers the whole horizon thereby detecting laser energy in a 360 degree field of view and displays images of the detected laser type, strength and direction on the IHAS heads up viewing screen assembly to enhances the soldier's survivability in the battlefield.

Another object of this invention is to provide a laser detection system mounted on a soldier's helmet in which the viewing screen assembly can be quickly and easily moved manually into and out of the soldier's field of view.

Another object of this invention is to provide a laser detection system mounted on a soldier's helmet wherein a major portion of the electronics equipment remains within a soldier's load carrying equipment, minimizing damage and eliminating headborne weight to minimize neck fatigue and encourage prolonged use.

Another object of this invention is to provide a laser detection system mounted on a soldier's helmet which shares a common electronic interface and power source with other LW subsystems to minimize logistics considerations such as; electronics weight and power requirements. Another object of this invention is to provide a laser detection system with minimized exposed cabling to eliminate catching/snagging objects and flapping in airborne operations.

Another object of this invention is to provide a helmet mounted, laser detection system for soldiers which is comparatively lightweight and small in size to accommodate the need to easily don/doff protective clothing, and doesn't materially interfere with ballistic/laser protection spectacles, Nuclear Biological Chemical (NBC) masks, LW PCIES, and other such equipment, nor impinge upon duties/operation of the soldier.

A still further object of this invention is to provide a laser detection system for soldiers mounted on an effective yet lightweight helmet without degrading ballistic impact protection. The helmet incorporates a retention system to maximize comfort while providing a stable platform for display viewing and laser detection. Moreover, the laser detection system is mounted for maximum exposure to laser sources from all positions and emplacements.

The above noted objects and other advantages of this invention are accomplished by a hands free laser detection system having multiple laser sensors mounted on the soldiers helmet for 360 degree FOV laser detection, a hinged viewing screen attached to the soldier's helmet that permits hands free viewing and identification of the laser energy, and a headset attached to the soldier's helmet which provides a multiple tone alert signal indicating the type of laser threat. The laser detection sensors each have a 180 degree FOV and are oriented so that the sensors FOV overlap thereby preventing any blind spots in the detectors coverage. The laser sensor signal measurements are then sent to the LW CRS where a detection algorithm compares the amplitude of the signal received by each sensor. This analysis enables the laser detection system to determine the quadrant direction of the detected threat, the type of laser, and distance of the laser with respect to the soldier. The CRS generates a visual and/or auditory alert and sends it to the IHAS, which displays the alert on the viewing screen and/or provides a audible signal to the headset. The laser detection system is integrated within the IHAS and CRS to minimize weight and costs, and yet remains a modular component to allow for growth and enhancements.

Further objects, features and advantages of the present invention will become apparent from the detailed description that follows.

DETAILED DESCRIPTION

Figure 1:
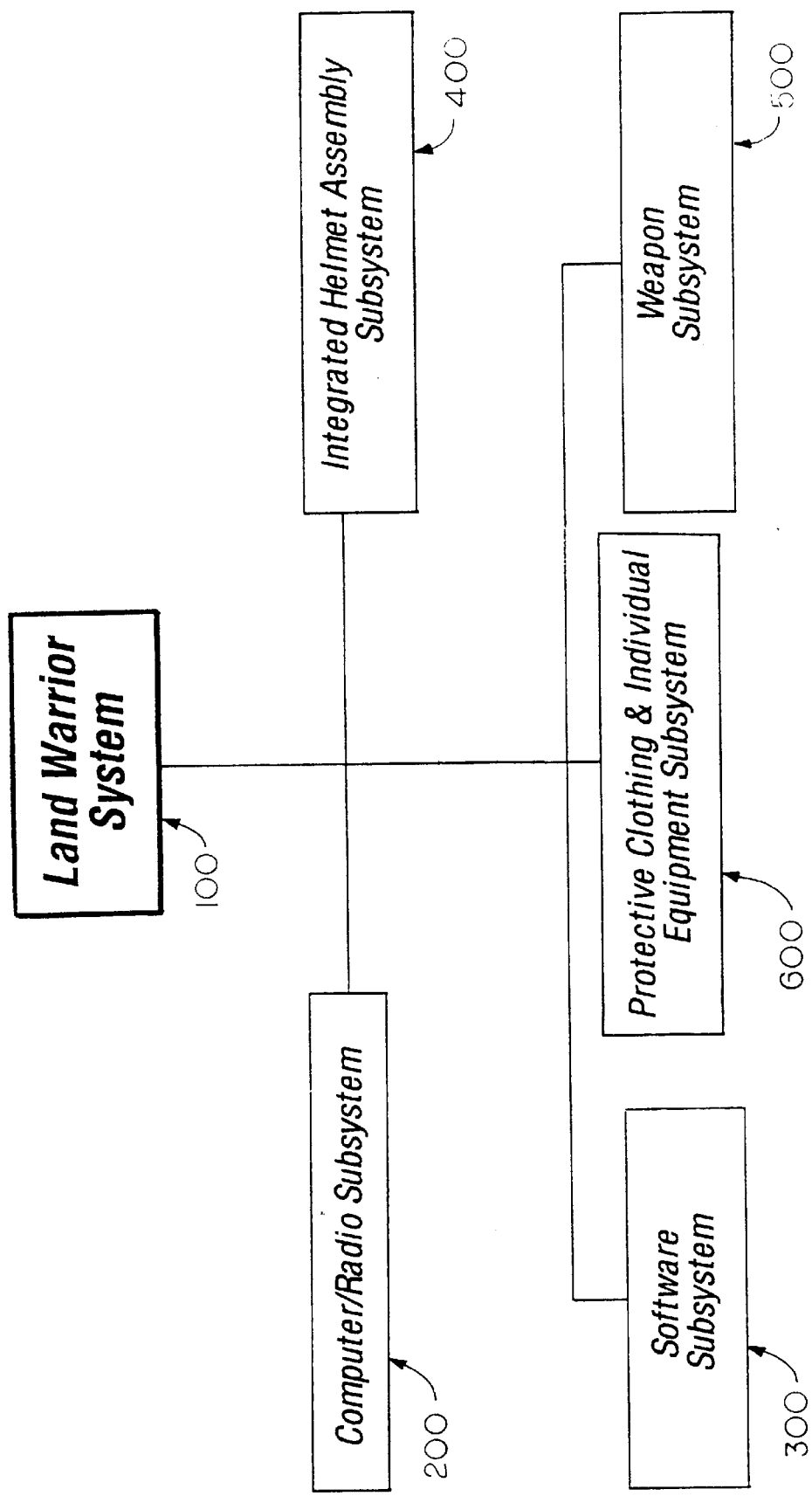
FIG. 1 is a block diagram of the Land Warrior (LW) system.

Referring now to FIG. 1, there in illustrated a block diagram of the LW system. The LW system includes various integrated individual fighting subsystems which can be utilized in conjunction with the present invention. The LW system is composed of five major subsystems including: (1) Computer/Radio Subsystem (CRS) 200; (2) Weapon Subsystem (WS) 500: (3) Integrated Helmet Assembly Subsystem (IHAS) 400; (4) Protective Clothing and Individual Equipment Subsystem (PCIES) 600; and, (5) LW Software Subsystem (LWSS) 300. The present invention is directed to a laser detection system which utilizes components of the IHAS 400 and the CRS 200.

Figure 2:
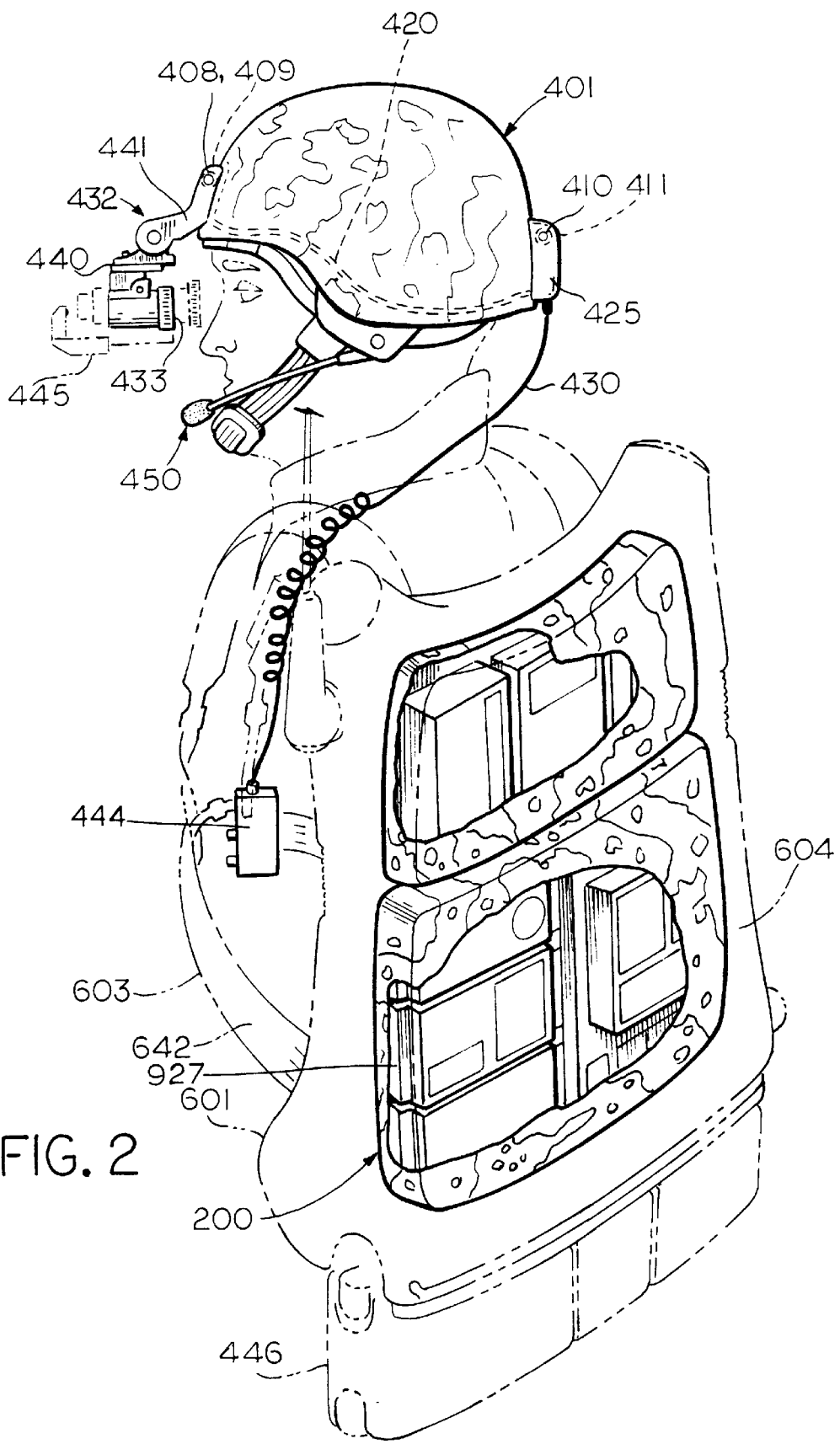
FIG. 2 is a side view of the soldier helmet showing the attachments of the components of the present invention.

Reference is now made to FIG. 2 in which is illustrated the IHAS 400 subsystem of the LW system 100. The IHAS 400 subsystem utilizes a wiring harness 927 of conventional design to link the Computer/Radio (CRS) 200, mounted within a LCE 601, with the sensor display module 432, display drive electronic module 425, and headset/ microphone communications assembly 450 of the laser detection system as further described herein. An important component of the IHAS 400 subsystem is the ballistic helmet 401 which provides the platform for integrating IHAS components along the rim/lip of the helmet.

The laser detection system utilizes the same IHAS wiring 430 and consists of a plurality of sensors. In a preferred embodiment, two dual sensors 408, 409 and 410, 411 reside interiorly of and are suitably secured to the inner surface of the outer shell of the sensor display module 432 and the display drive electronic module 425. The outer shell of the sensor display module 432 functions to shield internal components from electromagnetic effects. Each sensor 408–411 is provided with a relatively wide field of view (FOV) (nominally some 180 degrees) in its stationary position. The sensor display module 432 operates either in a stand alone mode, directly connected to the WS 500 components or with the CRS 200 as the connection with various video, graphical, and symbolic information sources.

The sensor display module 432 provides the LW an enhanced visual interface to the battlefield and aids in night and day operation through the monocular Night Sensor Display Component (NSDC) 445 and Day Display 440 heads-up display modules attached to the front helmet mount 441 which provides a viewing screen 433 positioned above the normal vision of the soldier with an Active Matrix Electroluminescent (AMEL) display on which the display to be viewed is illuminated. The AMEL display is driven by the display drive module 425 mounted on the rear of the helmet.

The opposing location of the display drive module 425 and sensor display module 432 provides a means of balancing the weight of the helmet 401 to increasing stability and user comfort thereby reducing soldier fatigue. Additionally, mounting the laser sensors 408–411 on the highest location on the soldier is particularly advantageous in that it offers the greatest probability of detection of a laser threat. Helmet mounting of the sensors 408–411 also provides a hard mount that maintains the relative orientation or the sensors in an eye-centered coordinate frame.

A preferred location of the laser sensors 408–411 is on the rear and front of the helmet 401, as shown in FIG. 2, with sensors 408–409 and sensors 410–411 aimed away from the center of the helmet 401 and oriented 45 degrees relative to the longitudinal center line of the helmet, but the invention may be practiced by locating the sensors 408–411 at the sides of the helmet, or any combination of locations provided each sensor is directed toward a specific quadrant and the sensor's FOV overlap adjacent quadrants. An important point is that the sensor's FOV should be oriented to overlap adjacent sensors FOV so as to provide a full 360 degree coverage without any blind spots in the detection coverage. Maintaining relative orientation of the sensors 408–411 is also a necessary condition to determine the quadrant direction of the threat relative to the centerline of the helmet. The present invention provides for such determination, as will be explained below.

In operation the display drive module 425 also houses the circuitry of the laser detection system, and accordingly receives an input from the laser sensors 408–411 by way of a analog/digital preprocessor power amplifier, not shown, which serve to process the optical signal from the sensors 408–411 and converts them to an amplified digital signal acceptable the CRS 200 where data processing can be performed. The CRS 200 determines which sensor 408–411 is providing the strongest incoming signal and will generate an auditory and/or visual alert signal which is then sent back to the helmet 425. The audio headset 450 interfaces with the CRS 200 and permits the reception of the computer-generated tones when laser pulse is detected. The display drive module 425 provides for the analog to digital conversion and digital processing of incoming video signals from the CRS 200 for real-time display on the viewing screen 433 of the sensor display module 432 to alert the soldier of the direction of the detested laser threat based upon which quadrant the signal originates from and the relative time between the sensor input signal received.

The CRS 200 may also provide approximate information as to the distance of the laser threat with respect to the soldier's location based upon signal strength, in cooperation with appropriate algorithms programmed therein. Further, the sensors 408–411 can discriminate between pulse and steady laser illumination to identify the type of laser threat such as, for example, a short-pulse laser from a range finder used by the armed forces for measuring distance to potential targets or a coded-pulse laser fired by a laser target designator. In the event of display failure, or as an alternative to a visual display the soldier may be alerted to the type of laser threat based on various audio toner generated by the CRS 200 and sent to the headset assembly 450. A determination of the type of laser threat, allows the soldier to make an effective response to the actual threat present.

The analog/digital preprocessor power amplifier within the display drive module 425 is preferably capable of providing 90–100 dB of gain at 20 MHz bandwidth. Further, it is preferred that the sensors sensitivity 408–411 provide infrared signal detection sensitivity of greater than $10^{-6}$ watts/cm$^2$ permitting detection of laser splash throughout the wide angle FOV provided by the laser detection system. The type of laser detection sensor suitable for the purposes of the present invention are commercially-available and manufactured by Tracor, Inc. however, various commercially-available substitutes for such component may be equally suitable for the purposes of practicing the present invention. Furthermore, the components described herein are well known to those skilled in the art and may be modified or adapted as desired once the invention is disclosed and described.

Power for the laser detection system and IHAS display electronics is received from a portable battery system 446. Within the CRS 200, power from the batteries 444 is converted to both low voltage DC and high voltage AC and distributed to the IHAS helmet mounted electronics which support the laser detection system. It will be understood that only a small amount of electrical power is required to operate the laser detection system's basic electronic circuitry and therefore can be operated independent of the other IHAS components. Other components of the IHAS system, such as the display module 432, may remain deactivated. This relatively small requirement for electrical power permits extended operation of the laser detection system using portable battery power.

Figure 4:
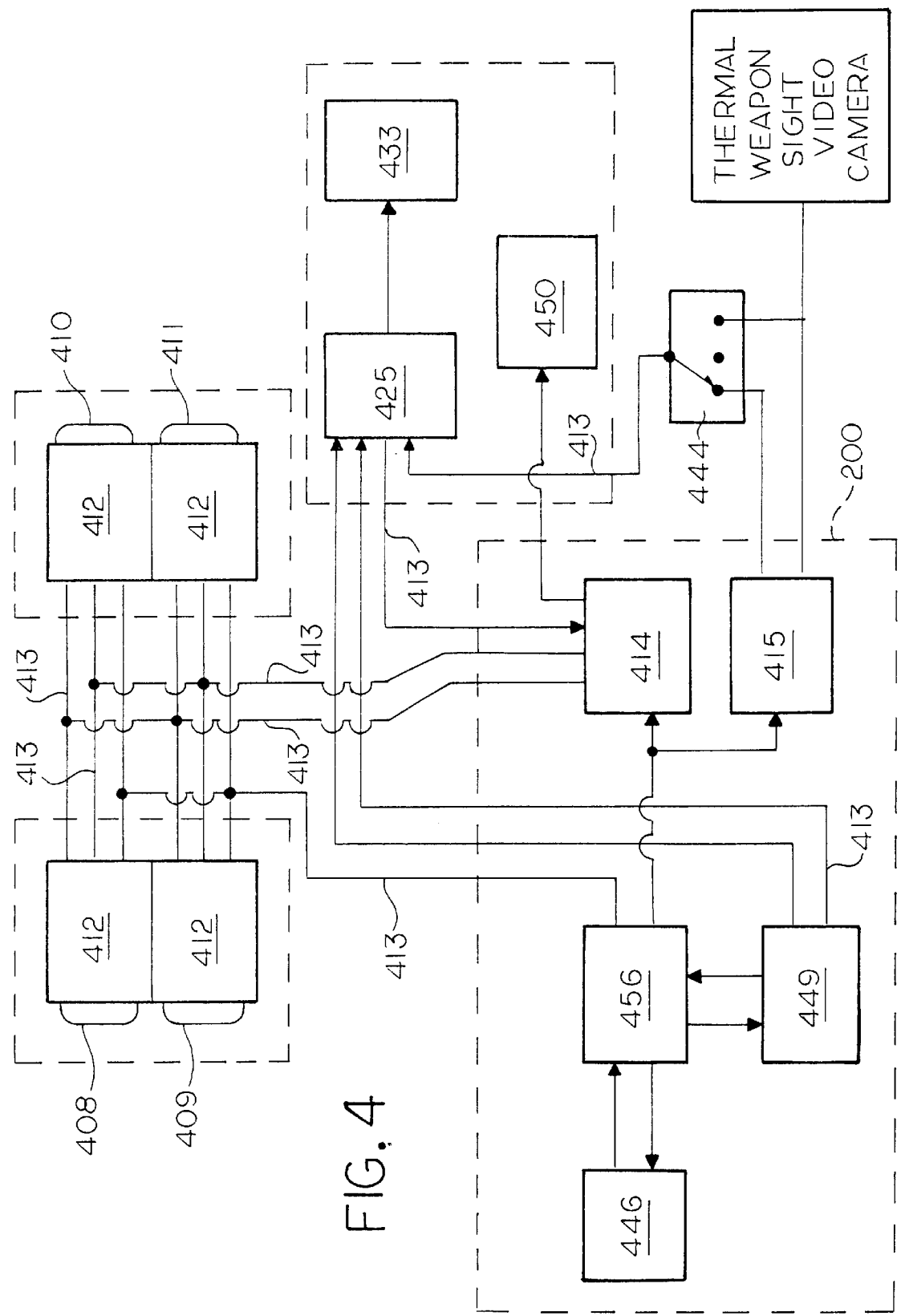
FIG. 4 is a schematic view of the electrical system of the helmet mounted laser detection system.

Shown in FIG. 4 is a schematic of the wiring for the helmet mounted laser detection system including front and back mounted laser detectors 406–411. The front and back laser detectors 408–411 each include a dual analog processor preamplifier and power conditioning module 412. The analog processors preamplifier and power conditioning modules 412 interface with the CRS 200 through analog signal and digital signal cables 413. The interface is monitored by an audio amplifier I/O processor 414 of a CRS 200 of a type well known in the art. The CRS 200 provides a rapid visual warning through a viewing screen 433 as well as an audio alarm to the soldier through the headset 450 in response to the processor 414 signal. The warning may be received by the soldier within about 100 milliseconds of laser detection.

It will be appreciated that the CRS 200 may also process a video signal from a thermal weapon sight and/or video camera through a video processor 415 of the CRS for display on the IHAS display viewing screen 433 by switching the torso mounted control box 444. The laser detectors 408–411, IHAS and CRS 200 systems are powered by the main battery 446, AC/DC power conversion 449 and power supply and distribution network 436 of a type well known in the art.

Referring still to FIG. 2, the brightness/contrast adjustment of the image displayed on the viewing screen 433 is conveniently located on the torso-mounted junction control box 444 attached to the soldier's backpack rib-cage support straps 603. The remote input pointing device (RIPD) (not shown) provides the means (membrane switch, or the like) for selecting various screen displays provided by the IRAS system. The rib-cage support straps 603 incorporate a wiring harness 642 of a type wall known in the art enclosed in a conductive braided shield that extends from within the LCE backpack frame 604 to the control boxes 444.

Figure 3:
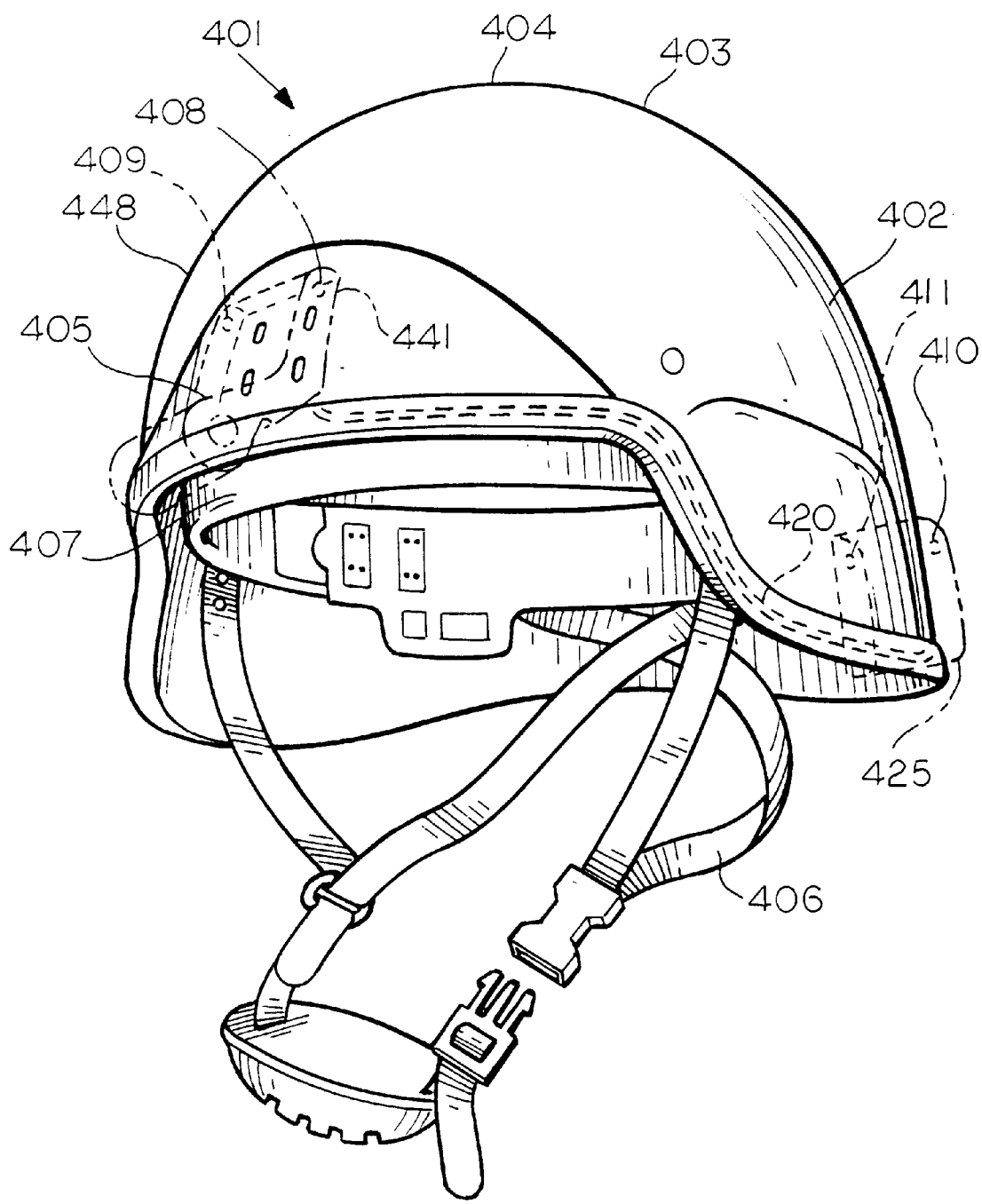
FIG. 3 is an exploded view of the soldier helmet showing the components of the helmet suspension system in an unassembled condition.

Turning now to FIG. 3 of the drawings, the helmet 401 for mounting the novel laser detection system is seen having a generally conventional appearance. Also visible in this view is the retention assembly for retention of the laser detection system and IHAS components. The retention assembly provides increased helmet stability required to maintain the alignment of the wearer's eye with the display exit pupil.

More specifically, the protective helmet 401 of the instant invention essentially comprises a rigid helmet shell 402 which can be fabricated of a suitable lightweight aramid material having improved ballistic impact properties as compared to that of a conventional military ballistic helmet shell. A snap-in edge band 405, preferably constructed of high impact polycarbonate material, provides the edge trim for the helmet shell 402 and serves as the attachment interface between the helmet shell 402, headband assembly 407, and retention assembly 406.

The snap-in edge band 405 also provides a host for mounting the sub-components and wiring of the IHAS 400 and laser detection system components. The front and rear of the snap-in edge band 405 include ports 448 for mounting the laser detectors in the four quadrants and allows for center helmet attachment of either left or right eye heads-up display versions. The modularity of the helmet's components, allow for a low-cost "plug and play" capability for all operational scenarios. The snap-on modular components also afford, growth and enhancements, and rapid routine field inspection, cleaning, maintenance, deployment and stowing.

Retention of the helmet 401 is accomplished by use of a retention assembly 406 which is preferably manufactured from nylon webbing and includes an elastomeric chin cup with foam liner for providing comfort and stability. Hook and pile closures on the chin strap provides for secured storage of the free end of the chin strap after tightening.

The retention assembly 406 is attached to the front and rear of the snap-in edge band 405 at the same points as the helmet shell 402 and offers a series of adjustment positions. The left and right straps cross over the nape to make full use of this area for maximum stability. The straps extend forward under the periphery of the ear to provide a stable platform without degrading the integration of other components such as, for example, the headset/microphone communications assembly 450. On tightening the chin strap, the webbing is naturally tensioned around the head creating an anchor point that is away from the center rotation of the helmet 401. This offset minimizes front to back slippage of the helmet 401 and further stabilizes the laser detection and display system.

As illustrated in FIG. 3, the headband assembly 407 is attached to the interior of the snap-in edge band 405 and is composed of two elastomeric straps which can be adjusted for different head circumferences. Both the headband assembly 407 and retention assembly 405 are fully adjustable to accommodate application of the helmet construction to individuals of various head sizes to thereby permit utilization of a single helmet by a plurality of individuals. The combination of the headband assembly 407 and retention assembly 406 provide head restraint forces which act in unison to maintain the helmet 401 on the user's head during operational ground and parachutist maneuvers.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A helmet including a laser detection system comprising:
    a plurality of sensors, said sensors adapted to generate an output signal in response to detected laser energy;
    a viewing screen coupled to said sensors and responsive to said output signal for forming a visual display; and
    an amplifier coupled to said sensors and responsive to said output signal to produce a signal having a corresponding amplitude, a processor in communication with the amplifier to evaluate the signal amplitude and produce a corresponding quadrant detection signal and generate a video and audio signal;
    a display drive module, coupled to said processor and responsive to said detection, video and audio signals to provide a warning signal and video display signal;
    a sensor display module coupled to said display drive module and further coupled to said viewing screen; wherein the sensor display module is responsive to said video display signal for forming said visual display on said viewing screen; and
    a headset assembly coupled to said helmet and responsive to said audio signal to provide an audible tone responsive to the level of laser energy.

2. The helmet of claim 1 wherein said sensors are mounted on the highest location on the soldier.

3. The helmet of claim 1 wherein said sensors are aimed away from the helmet center and oriented 45 degrees relative to a longitudinal center line of the helmet.

4. The helmet of claim 1 wherein said sensors are positioned such that said sensors provide a 360 degree field of view.

5. The helmet of claim 1, wherein said laser detection system further comprises a battery cell integral with said laser detection system, operably connected to provide power to said detection system.

6. The helmet of claim 1, further comprising a switch electrically connected to said detection system for initiating operation of said detection system.

7. The laser detection system of claim 1, wherein said plurality of sensors further comprises a housing having electromagnetic shielding.

8. The helmet of claim 1 wherein said sensors are mounted on the helmet to provide a hard mount that maintains the relative orientation of said sensors in an eye-centered coordinate frame.

9. The helmet of claim 6 wherein said sensors are positioned on the rear and front of said helmet.

10. A helmet including a laser detection system comprising:
    a plurality of sensors, said sensors adapted to generate an output signal in response to detected laser energy;
    a viewing screen coupled to said sensors and responsive to said output signal for forming a visual display; and
    an amplifier coupled to said sensors and responsive to said output signal to produce a signal having a corresponding amplitude, a processor in communication with the amplifier to evaluate the signal amplitude and produce a corresponding quadrant detection signal and generate a video and audio signal;
    a display drive module, coupled to said processor and responsive to said detection, video and audio signals to provide a warning signal and video display signal;
    a sensor display module coupled to said display drive module and further coupled to said viewing screen; wherein the sensor display module is responsive to said video display signal for forming said visual display on said viewing screen wherein said display drive module and said sensor display module are mounted on the helmet; and
    a headset assembly coupled to said helmet and responsive to said audio signal to provide an audible tone responsive to the level of laser energy.

11. A helmet including a laser detection system comprising:
    a plurality of sensors, said sensors adapted to generate an output signal in response to detected laser energy;
    a viewing screen coupled to said sensors and responsive to said output signal for forming a visual display; and
    an amplifier coupled to said sensors and responsive to said output signal to produce a signal having a corresponding amplitude, a processor in communication with the amplifier to evaluate the signal amplitude and produce a corresponding quadrant detection signal and generate a video and audio signal;
    a display drive module, coupled to said processor and responsive to said detection, video and audio signals to provide a warning signal and video display signal;
    a sensor display module coupled to said display drive module and further coupled to said viewing screen; wherein the sensor display module is responsive to said video display signal for forming said visual display on said viewing screen wherein said display drive module and said sensor display module are mounted on the helmet wherein said display drive module and said sensor display module are positioned to balance the weight of the helmet; and
    a headset assembly coupled to said helmet and responsive to said audio signal to provide an audible tone responsive to the level of laser energy.

12. A helmet including a laser detection system comprising:
    a plurality of sensors, said sensors adapted to generate an output signal in response to detected laser energy;
    a viewing screen coupled to said sensors and responsive to said output signal for forming a visual display wherein said viewing screen is monocular;
    an amplifier coupled to said sensors and responsive to said output signal to produce a signal having a corresponding amplitude, a processor in communication with the amplifier to evaluate the signal amplitude and produce a corresponding quadrant detection signal and generate a video and audio signal;

a display drive module, coupled to said processor and responsive to said detection, video and audio signals to provide a warning signal and video display signal;

a sensor display module coupled to said display drive module and further coupled to said viewing screen; wherein the sensor display module is responsive to said video display signal for forming said visual display on said viewing screen;

a headset assembly coupled to said helmet and responsive to said audio signal to provide an audible tone responsive to the level of laser energy.

an optical system assembly coupled to said sensor display module and responsive to said video display signal for forming said visual display on said viewing screen.

13. The helmet of claim 12, wherein said sensors are oriented upon said helmet to provide overlapping field of view laser detection coverage.

14. In a fully integrated, multi-functional, soldier-centered, computer enhanced warfare system, a compact selectively activated laser detection system comprising:

a mobile platform having equally divided quadrants wherein said mobile platform is a helmet;

a plurality of sensors mounted on said mobile platform for the detection of infrared emission by a laser, wherein each sensor of said plurality of sensors is assigned to one of said quadrants;

a video monitor mounted on said mobile platform for forming a visual display; and a control assembly including circuitry coupled to said sensors for determination of the direction, type and range of said infrared emission by the laser and activation of said video monitor.

15. In a fully integrated, multi-functional, soldier-centered, computer enhanced warfare system, a compact selectively activated laser detection system comprising:

a mobile platform having equally divided quadrants wherein said mobile platform is a helmet, wherein said helmet further comprises an annular snap-in rim member connected to the rim of said helmet for mounting wiring of the laser detection system;

a plurality of sensors mounted on said mobile platform for the detection of infrared emission by a laser, wherein each sensor of said plurality of sensors is assigned to one of said quadrants;

a video monitor mounted on said mobile platform for forming a visual display; and a control assembly including circuitry coupled to said sensors for determination of the direction, type and range of said infrared emission by the laser and activation of said video monitor.

16. In a fully integrated, multi-functional, soldier-centered, computer enhanced warfare system, a compact selectively activated laser detection system comprising:

a mobile platform having equally divided quadrants wherein said mobile platform is a helmet, wherein said helmet further comprises an annular snap-in rim member connected to the rim of said helmet for mounting wiring of the laser detection system wherein the snap-in rim member includes ports for mounting the laser detectors;

a plurality of sensors mounted on said mobile platform for the detection of infrared emission by a laser, wherein each sensor of said plurality of sensors is assigned to one of said quadrants;

a video monitor mounted on said mobile platform for forming a visual display; and a control assembly including circuitry coupled to said sensors for determination of the direction type and range of said infrared emission by the laser and activation of said video monitor.

17. A compact laser warning system for detecting a laser pulse mounted on a helmet, said laser system comprising:

a cooperative quadraplex sensor assembly which responds to the laser pulse by producing an output signal having a voltage level proportional to the energy content of said laser pulse;

an amplifier coupled to said sensor assembly and responsive to said output signal to produce a signal having a corresponding amplitude, a processor in communication with the amplifier to evaluate the signal amplitude and produce a corresponding quadrant detection signal and generate a video and audio signal;

a display drive module, coupled to said processor and responsive to said detection and video signals to provide a warning video display signal;

a sensor display module coupled to said display drive module and responsive to said video display signal for forming a visual display; and a headset assembly coupled to said helmet and responsive to said audio signal to provide an audible tone responsive to the level of laser energy.

18. A helmet including a laser detection system comprising:

a plurality of sensors, said sensors adapted to generate an output signal in response to detected laser energy:

a viewing screen coupled to said sensors and responsive to said output signal for forming a visual display and said viewing screen is monocular;

an amplifier coupled to said sensors and responsive to said output signal to produce a signal having a corresponding amplitude, a processor in communication with the amplifier to evaluate the signal amplitude and produce a corresponding quadrant detection signal and generate a video and audio signal;

a display drive module, coupled to said processor and responsive to said detection, video and audio signals to provide a warning signal and video display signal;

a sensor display module coupled to said display drive module and further coupled to said viewing screen; wherein the sensor display module is responsive to said video display signal for forming said visual display on said viewing screen;

a headset assembly coupled to said helmet and responsive to said audio signal to provide an audible tone responsive to the level of laser energy;

an optical system assembly coupled to said sensor display module and responsive to said video display signal for forming said visual display on said viewing screen, wherein said optical system assembly is a monocular viewing screen attached to said helmet wherein said image is disposed.

* * * * *